United States Patent [19]
Träubel et al.

[11] B 3,920,588
[45] Nov. 18, 1975

[54] MICROPOROUS SHEET STRUCTURES

[75] Inventors: Harro Träubel; Klaus Konig, both of Leverkusen, Germany

[73] Assignee: Bayer Aktiengesellschaft, Leverkusen, Germany

[22] Filed: Dec. 11, 1972

[21] Appl. No.: 314,049

[44] Published under the Trial Voluntary Protest Program on January 28, 1975 as document no. B 314,049.

Related U.S. Application Data

[63] Continuation of Ser. No. 161,321, July 9, 1971, abandoned.

[30] Foreign Application Priority Data

July 11, 1970 Germany............................ 2034538

[52] U.S. Cl......... 260/2.5 AY; 117/135.5; 161/159; 161/190; 260/30.8 DS; 260/31.8 G; 260/31.8 R; 260/32.6 N; 260/33.6 UB
[51] Int. Cl.$^2$............................................. C08J 9/06
[58] Field of Search................260/33.6 UB, 2.5 AY, 30.8 DS, 260/31.8 R, 31.8 G, 32.6 N; 117/135.5; 161/159, 190

[56] References Cited
UNITED STATES PATENTS

| | | | |
|---|---|---|---|
| 3,536,639 | 10/1970 | Schachowskoy | 260/2.5 |
| 3,582,396 | 6/1971 | Konig et al. | 260/2.5 |
| 3,622,526 | 11/1971 | Zorn et al. | 260/2.5 |
| 3,625,871 | 12/1971 | Traubel et al. | 260/2.5 |
| 3,692,570 | 9/1972 | Traubel et al. | 260/2.5 |

*Primary Examiner*—Melvyn I. Marquis
*Assistant Examiner*—Eugene C. Rzucidlo
*Attorney, Agent, or Firm*—Joseph C. Gil

[57] ABSTRACT

Microporous sheet structures are provided and a method for their production which comprises reacting an organic polyisocyanate with an organic compound containing at least two hydroxyl or amino hydrogen atoms reactive with NCO groups as starting materials to produce a polyaddition product which in the homogeneous state exhibits a shore A hardness greater than 40 and a softening range above 100°C. The said reaction is effected in an organic liquid which dissolves the starting materials, does not dissolve the polyaddition product, boils below 250°C and contains 1 to 300 percent by weight, based on the polyaddition product to be formed, of a polar solvent which is inert to the starting materials. Said polar solvent has a greater evaporation number than the components of the aforesaid organic liquid (in the following called nonsolvent), the nonsolvent being such that while the polyaddition product forms, it gradually becomes increasingly insoluble in the mixture of polar solvent and nonsolvent. This mixture has no significant swelling effect upon the polyaddition product.

2 Claims, No Drawings

MICROPOROUS SHEET STRUCTURES

This application is a continuation of copending application, Ser. No. 161,321 filed July 9, 1971, now abandoned and relates to a method of production of microporous sheet structures.

A lot of processes for the production of microporous sheet structures have been described in the art. Most of them involve coagulation methods; observing certain modes of action and starting from suitable compounds, polyurethanes may be precipitated from their solutions in such a way that microporous sheets are obtained.

This may be effected either by immersing a substrate which is coated with the solution of a polyurethane into a coagulation bath containing a liquid or a mixture of liquids that do not dissolve the polymer (see, for example, U.S. Pat. Nos. 3,100,721; 3,536,639; 3,595,685 and 3,622,526) or by evaporating selectively the solvent from a polymer/solvent/nonsolvent-mixture. According to U.S. Pat. No. 3,553,008, the polyurethane is dissolved in a mixture of low boiling solvent and high boiling nonsolvent, from which the solvent evaporates selectively (the evaporation number of the nonsolvent ought to be at least twice that of the solvent), the polymer thus being precipitated. As a common feature of these two processes, the solvent in the polyurethane solution is replaced gradually by a nonsolvent so that the initially colloidal solution is transformed to a gel and finally to a stable microporous structure. Deutsche Offenlegungsschrift No. 1,504,234 discloses an analogous process for polymers other than polyurethane.

U.S. Pat. Nos. 3,582,396 and 3,595,732 disclose a process where the starting components for the polyurethane (NCO-pre-polymer and chain extending agent or polyol, polyisocyanate and chain extending agent) are dissolved in a liquid or mixture of liquids which is a nonsolvent for the final polyaddition product. It is the object of these two patents to synthesize the microporous sheetings directly, without any additional coagulation step. As reaction proceeds, the growing polymer molecules become less and less soluble, first a dispersion, then a gel is formed and finally one obtains an interconnecting, stable microporous structure from which the organic liquid is evaporated. It was expected that it were only possible to obtain a microporous sheet structure if the organic liquid consisted of a nonsolvent, a mixture of nonsolvents or a mixture of nonsolvents and a volatile solvent for the polymer that has a lower evaporation number than the nonsolvent (in this case the solvent preferentially evaporates during reaction so that only the nonsolvents are remaining). The disclosures of Deutsche Offenlegungsschrift No. 1,504,234 and U.S. Pat. Nos. 3,553,008, 3,582,396 and 3,595,732, therefore, explicitly advise against using a polyurethane solvent evaporating at a higher temperature than the nonsolvents present in order to avoid a collapse of the microporous structure after the bulk of the nonsolvent has been removed by evaporation.

Surprisingly it has been found, however, that it is possible also to add certain amounts of highly polar solvents with a greater evaporation number than the nonsolvents present though one had to expect that such difficultly volatile liquids, being very good solvents and softeners for polyurethanes, would give rise to formation of a homogenous, impervious foil or coating. On the contrary, the process and the microporous sheet structures obtained are even improved considerably when the reacting mixture contains small quantities of polar compounds with a high evaporation number.

The main disadvantage of the known processes for direct synthesis of microporous foils and coatings is the rapid solidification of the reacting mixture. This effect gives rise to an inferior flow during the coating step and in connection therewith to an impeded dyeability.

Due to the addition of high-boiling polar solvents according to the invention the polyadduct formed remains dissolved longer so that a higher degree of polyaddition prior to precipitation of the polymer is obtained. The reacting mixture remains for a longer period in a pourable, lower viscous state, thus facilitating dyeing of the product. Moreover, a more uniform microporous structure is formed and therefore the tensile strength of the sheets is improved. Of course, only a limited amount of the additive may be used. Otherwise the polar solvent is retained in the polymer during evaporation of the nonsolvent and the microporous structure collapses.

The present invention relates to a process for the production of microporous sheet structures which comprises reacting an organic polyisocyanate with at least one organic compound containing at least two hydroxyl or amino hydrogen atoms reactive with NCO groups as starting materials to produce a polyaddition product which in the homogeneous state exhibits a shore A hardness greater than 40 and a softening range above about 100°C., said reacting being effected in an organic liquid which dissolves the starting materials does not dissolve the polyaddition product boils below 250°C. and which contains as an additive 1 to 300 percent by weight based on the polyaddition product to be formed of a polar solvent which is inert to the starting materials and which has a higher evaporation number than the components of the organic liquid, the mixing proportion of polar solvent on organic liquid being such that while the poly-addition product forms the polyaddition product gradually becomes increasingly insoluble in the mixture of polar solvent and organic liquid which has no significant swelling effect upon the polyaddition product, the quantity of polar solvent being that which does not exceed that which the polyaddition product is capable of enclosing as an internal phase.

The preferred amount of the polar solvent is 5 to 100 percent by weight based on polyurethane to be formed. This polar solvent will be termed solvent in contrast to the organic liquid which dissolves the starting compounds but is a nonsolvent for the fully reacted polyaddition product.

The polyurethane starting compounds required for the process are known: Diisocyanates and polyisocyanates are used as the NCO-group-containing compounds. Amines aminoalkanols and hydrazine and its derivatives are used as the $NH_2$-group-containing compounds. Suitable OH-group-containing compounds include low molecular weight (18 – 500) and medium molecular weight (500–3500) glycols, polyethers, polythioethers, polyesters, polyetheresters, polyacetates, polyesteramides and polysiloxanes. The compounds are reacted with one another by the one-stage or by the two-stage process.

1. One-stage process

Providing the amine and/or hydroxyl reactants do not differ appreciably from one another in their reactivity towards isocyanate, it is of advantage to apply the one-stage process in which the reactants are mixed together in the solvent without being reacted beforehand, and are then reacted to form the polyurethane.

2. Two-stage process

Where the amine and/or hydroxyl reactants differ appreciably from one another in their reactivity towards isocyanate, the more quickly reacting compounds would preferentially react with the isocyanate, in other words they would form compounds substantially insoluble in the organic solvent and would be precipitated, thus interfering with polyurethane formation. This is primarily the case where it is desired to react $NH_2$-group-containing compounds, especially amines and OH-group-containing compounds, with polyisocyanates. For this reason, a two-stage process is applied in an instance such as this. In this process, the OH-group-containing compounds are reacted in a first stage, for example, with excess polyisocyanate to form a "prepolymer". The prepolymer is then reacted in a second stage with the more quickly reacting compounds in the organic solvent.

The following example shows the principle of a two-stage process, without limiting the scope of the invention. First step: Formation of prepolymer

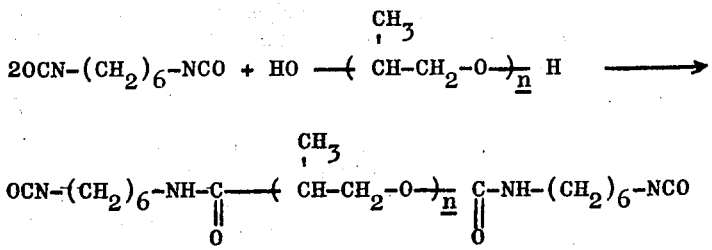

In a second step, the prepolymer formed is reacted with a diamine, for example ethylene diamine, to form the high molecular weight microporous polyurethane-polyurea:

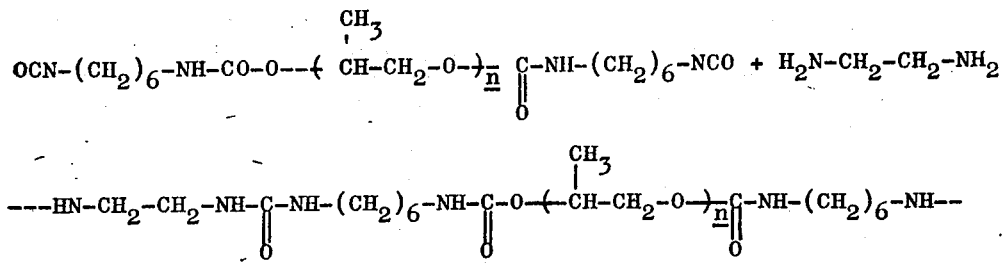

polyurethane-polyurea

Starting materials of the process according to the invention include medium molecular weight (500 – 5,000) compounds with at least two terminal OH-groups, such as polyethers, polyesters, polycarbonates, polyacetates, polythioethers and polysiloxanes. Materials of this kind are described for example in J. H. Saunders and K. C. Frisch "Polyurethanes" I, New York, (1962), pages 32 to 61 and in the literature quoted there.

Particular reference is made to polyesters of adipic acid and optionally mixtures of dialcohols, for example ethylene glycol, propylene glycol, 1,4-butane diol, 2,5-hexane diol, 2,2-dimethyl-1,3-propane diol, 1,6-hexane diol, 2-methyl-1,6-hexane diol, 2,2-dimethyl-1,3-hexane diol, p-bis-hydroxymethylcyclohexane, 3-methyl-1,4-pentane diol and 2,2-diethyl-1,3-propane diol, preferably those with diols or mixtures of diols containing five or more C-atoms since polyesters such as these show a relatively high resistance to hydrolysis and outstanding low-temperature elasticity in the end products, especially in cases where diols with lateral alkyl groups are also used. Polyesters obtained by the polymerisation of caprolactone on diethylene glycol with a narrow molecular weight distribution, also represent particularly suitable starting materials. Particular reference is made in this connection to the polyesters obtained from diphenyl carbonate and glycols.

Polyurethanes and polyurethane-ureas with an outstanding resistance to hydrolysis can also be obtained from polyalkylene ethers for example polypropylene glycols and with particular preference from polytetramethylene ether diols which may optionally also be present as mixed polyethers.

Surprisingly, the process according to the invention can also be carried out in cases where water-miscible polyhydroxyl compounds, for example polyethylene glycolether diols, are used, in which case polyurethanes with a high water-absorbing capacity are obtained. Polyols, aminols and polyamines are mentioned as examples of low molecular weight chain extenders containing at least two OH- or NH-groups.

Chain-extending agents should have a molecular weight of from 18 to approximately 500 and preferably from 32 to 350. Apart from water, suitable chain extenders include for example, optionally in admixture, ethylene glycol, propylene glycol, 1,4-butane diol, 1,6-hexane diol, hydroquinone-bis-($\beta$-hydroxy-ethylether) p-xylylene glycol, also ethylene diamine, 1,2- or 1,3-propylene diamine, 1,4-tetramethylene diamine, 1,6-hexamethylene diamine, 2,2,4-trimethyl-1,6-hexane diamine, 1-methylcyclohexane-2,4-diamine, 1-amino-3-aminomethyl-3,5,5-trimethylcyclohexane, 4,4'-diaminodicyclohexylmethane, bis-(amino-propyl)-piperazine or aromatic diprimary amines such as 4,4'-diaminodiphenylmethane, bis-2,2-(4-aminophenyl)-propane, 4,4'-diaminodiphenylsulphide, 4,4'-diaminodiphenylether, 1-methyl-2,4-diaminobenzene or araliphatic diprimary diamines such as m-xylylene diamine, $\alpha, \alpha, \alpha', \alpha'$-tetramethyl-p-xylylene diamine, 1,3-bis-($\beta$-aminoisopropyl)-benzene, also diamines containing sulphonic acid groups such as 4,4'-diaminostilbene-2,2'-disulphonic acid or 4,4'-diaminodiphenylethane-2,2'-disulphonic acid, ethylene diamine-N-butyl sulphonic acid, hexamethylene diamine-1,6-N-butylsulphonic acid, 1,6-diamino-hexamethylene-3-sulphonic acid or their alkali metal salts, hydrazides such as carbodihydrazide, oxalic acid dihydrazide, malonic acid dihydrazide, succinic acid dihydrazide, also addition products of ethylene oxide and propylene oxide with ammonia or aliphatic or aromatic amines such as for example di- and tri-ethanolamine or methyl or phenyl diethanolamine, which increase the affinity of the products towards dyes, also hydrazine, for example even in the form of hydrazine hydrate, methyl hydrazine and dihydrazines such as for example N,N'-diaminopiperazine.

It is also possible to use secondary diamines, preferably of symmetrical structure such as piperazine or 2,5-dimethylpiperazine or 3,3'-dichloro or 3,3'-dimethyl-4,4'-di-(methylaminophenyl)-methane.

The usual polyisocyanates (described for example by W. Siefken in Liebigs Ann. Chem. 562, 75–136 (1949)) or relatively high molecular weight reaction products containing at least two NCO— groups per molecular (so-called prepolymers with an NCO:OH-ratio of at least 1,2) of the aforementioned compounds containing OH-groups and excess polyisocyanates, are suitable for use in the process according to the invention. Aliphatic, araliphatic, aromatic and heterocyclic diisocyanates or mixtures thereof represent particularly suitable polyisocyanates. Particular reference is made to diisocyanates of symmetrical structure, for example diphenylmethane-4,4'-diisocyanate, diphenyldimethylmethane-4,4'-diisocyanate, 2,2',6,6'-tetramethyldiphenylmethane- 4,4'-diisocyanate, diphenyl-4,4'-diisocyanate, diphenylether-4,4'-diisocyanate or their alkyl-, alkoxyl- or halogen-substituted derivatives, also tolylene-2,4- and -2,6-diisocyanate and commercial mixtures thereof, 2,4-diisopropylene-phenylene-1,3-diisocyanate, m-xylylene diisocyanate, p-xylylene diisocyanate and α,α, α', α'-tetramethyl-p-xylylene diisocyanate, also alkyl- or halogen-substitution products of the above-mentioned diisocyanates for example 2,5-dichloro-p-xylylene diisocyanate or tetrachloro-p-phenylene diisocyanate, dimeric tolyene-2,4-diisocyanate, bis-(3-methyl-4-isocyanatophenyl)-urea or naphthalene-1,5-diisocyanate. Aliphatic diisocyanates such as hexane-1,6-diisocyanate, cyclohexane-1,4-diisocyanate, dicyclohexyl-methane-4,4'-diisocyanate, 1-isocyanato-3-isocyanatomethyl-3,5,5-trimethylcyclohexane or 2,2,4-trimethylhexane-1,6-diisocyanate can optionally be used in proportionate quantities and give products which show little or no discolouration on exposure to light. Such diisocyanates as ω,ω'-di-(isocyanato-ethyl)-benzene or 1,2,3,4,5,6-hexahydrodiphenylmethane-4,4'-diisocyanate also give products which show little or no discolouration on exposure to light.

By virtue of the ready availability and their wide range of properties, it is preferred to use diphenylmethane-4,4'-diisocyanate, the isomeric tolylene diisocyanates and, optionally in proportionate quantities, hexane-1,6-diisocyanate and dicyclohexylmethane-4,4'-diisocyanate.

In the two-stage process, the medium high molecular weight polyhydroxyl compounds are reacted with the diisocyanates for example in a molar ratio of from 1:1.25 to 1:4.0, optionally in several stages, for example where different diisocyanates are used, either in the melt or in solvents inert to isocyanates, such as tetrahydrofuran, dioxane, chlorobenzene, at temperatures in the range from about 40° to 130°C. and preferably at temperatures in the range from 70° to 100°C.. The reaction times are such that a substantially linear preadduct with terminal NCO-groups is obtained which, on reaction with substantially equivalent quantities of bifunctional chain extenders, gives a substantially linear elastomeric polyurethane or polyurethane urea.

The reaction with the diisocyanates is carried out at preferably low NCO:OH ratios, for example from 2.0:1 to 1.25:1, where the polyhydroxyl compound has low molecular weights, for example in the range from 750 to 1,250, and preferably at high NCO:OH ratios for example 3:1 to 1.65:1, where it has a high molecular weight, for example in the range from 1,700 to 2,500.

In addition to the medium molecular weight polyhydroxyl compounds, it is also possible to use low molecular weight diols (molecular weight preferably below 250), for example ethylene glycol, 1,4-butane diol, bis-N,N-(β-hydroxyethyl)methylamine, bis-N,N-(β-hydroxypropyl)-methylamine, N,N'-bis-hydroxyethyl-piperazine or hydroquinone-bis-(β-hydroxyethylether), in quantities of from for example 10 to 300 mol percent of the OH-content, preferably 20 to 100 mol percent of the relatively high molecular weight polyhydroxyl compound. The use of diols containing tertiary nitrogen improves affinity for dyes in particular, increases stability to light and creates a starting point for further after-treatments, for example cross-linking with for example compounds with a strong alkylating effect, such as 4,4'-di-chloromethyldiphenylether.

The NCO-group content of the preadduct (based on solvent-free preadduct) is of significance so far as the properties of the polyurethanes obtained from them are concerned. It should amount to at least 0.50 percent by weight and is preferably from about 1.00 to about 7.6 percent by weight, more particularly from about 1.5 to 4.0 percent by weight, to ensure that the polyurethanes have sufficiently high melting points, tensile strength, breaking elongation and strain values. Where the chain-extending reaction is carried out with water, the NCO-content is preferably higher, for example from 3.5 to 7.6 percent by weight because some of the NCO groups are formally first hydrolysed into amino groups.

Liquid organic compounds which preferably boil at below 250°C, preferably at 25° to 250° C and which under the reaction conditions are liquid and do not react with the starting materials, may be used as solvents for the process according to the invention. Examples of suitable solvents include aliphatic hydrocarbons such as pentanes, hexanes and their homologues, optionally alkylated cycloalkanes, such as cyclohexane, methylcyclohexane, cyclododecane, petroleum fractions, especially mixtures of aliphatic hydrocarbons with boiling points from 80° to 250°C., for example ligroin, cleaning spirit, white spirit, mepasin, turpentine oils, mixed aliphatic-aromatic hydrocarbons such as tetralin, decalin, aromatic hydrocarbons such as benzene, toluene, xylene, ethyl benzene, diethyl benzene, mesitylene, chlorinated hydrocarbons such as di-, tri, tetra-chloromethane, di-, tri- perchlorethylene, di-, tri-, tetra-, penta-, hexa-chloroethane, 1,2- and 1,3-dichloropropane, i-butyl chloride, dichlorohexane, chlorocyclohexane, chlorobenzene, chlorotoluene, ethers such as di-n-propyl-, di-i-propylether, di-n-butylether, ethylpropylether, anisol, phenetol, esters such as carbonic acid diethylester, -dimethyl ester, acetic acid ethylester, -propylester, -butylester, amylester, -hexylester, methoxybutyl acetate, propionic acid methylester, -ethylester, methylglycol acetate, oxalic acid dimethylester, ketones such as acetone, methylethyl ketone, methyl-i-butylketone, methoxyhexanone, mesityloxide, phorone and cyclohexanone.

The reaction of the starting compounds can be catalysed by the usual isocyanate-polyaddition catalysts (cf. J. H. Saunders and K. C. Frisch "Polyurethanes"I, New York (1962), page 212). It is preferred to use volatile tertiary amines because, as already known, they have the least effect upon the resistance of the end products to hydrolysis.

The process is preferably carried out as follows:
1. One-stage process

The —OH and optionally the NH-group-containing components are dissolved in the solvent/nonsolvent-mixture, the polyisocyanate, which may optionally be dissolved as well, is stirred in at the requisite temperature and a catalyst optionally added to the mixture. The heat of reaction from the polyaddition reaction in its initial stages increases the temperature of the solution. After a while, the solution generally turns cloudy, accompanied by an increase in its viscosity. The solution is then poured on to porous or non-porous substrates. After an interval of up to 20 minutes, the solution gels. It is, of course, also possible to use reaction mixtures with longer gelling times, although this is not of any real advantage from the commercial point of view, Polyaddition is preferably completed on the substrate at a drying cabinet temperature above 60°C., as a result of which the film hardens and solvent and nonsolvent are removed by evaporation. It is also possible to operate at lower temperatures although this does lengthen the reaction time.

2. Two-stage process

In the two-stage process, a so-called "prepolymer" is prepared by conventional methods by reacting a dehydrated medium molecular weight compound containing at least two OH-groups with excess polyisocyanate until the theoretical NCO-content of the prepolymer is reached. The prepolymer obtained is then dissolved in the solvent/nonsolvent-mixture and mixed with solid or similarly dissolved polyamine. The mixture is formed and polyaddition completed with simultaneous removal of solvent and nonsolvent.

The microporous sheet structure when made on a non-porous substrate, is removed and bonded by means of non-continuous layers of adhesive onto the final substrate such as woven fabrics, webs, knit fabrics or skiver. The sheet structures prepared directly on a porous substrate and those transferred to a porous substrate can be finished and further processed by the techniques normally applied for artifical leather.

The composition of the starting materials must be such that a polyurethane is formed which, in the form of a homogeneous non-porous sheet, has a Shore-A-hardness of more than 40 kp/cm², preferably more than 200 kp/cm², and a softening range above 100° C., preferably above 130° C. Shore-A-hardness is determined in accordance with DIN 53 505. The softening range can be determined in known manner, for example, on a Kofler bench (cf. Houben-Weyl (1953) "Analytische Methoden" 789,792).

Suitable recipes for polyurethanes can be found in the literature, for example, E. Muller, et al., "Angewandte Chemie" 64 (1952) 523–531. Where undescribed compositions are considered, it is advisable to prepare the polyurethane in bulk by the melt-casting technique or in dioxane and then to examine its properties.

Polyurethanes which give the values referred to above can be obtained for example as follows:
1. 1 mol of a linear or weakly branched compound with terminal OH-groups and a molecular weight of from 1,500 to 2,500.
2. 0.5 to 4 mols of one of the conventional polyurethane chain extenders.
3. Polyisocyanate with an NCO:OH or NH-ratio of 0.9–2.0.

These starting compounds (1-3) are reacted in the solvent/nonsolvent mixture in a concentration of 10 to 90 percent, usually 20 to 60 percent. The higher the proportion of the highly polar additive, the larger the necessary amount of nonsolvent.

The reactivity toward isocyanate of the medium molecular weight compounds containing at least two terminal OH-groups should not differ too greatly from the reactivity of the chain extending (crosslinking) agent in the one-stage process. The reactivities are preferably substantially the same, although the reactivity of the crosslinking agent can even be greater or lower by a factor of up to 5 and preferably by a factor of up to 2. The reactivity is the reaction velocity constant in 1/mol sec. (cf. J. H. Saunders and K. C. Frisch "Polyurethanes" I New York (1962), pages 206 and 208).

The nonsolvent suitable for use in the process according to the invention must dissolve the starting materials at the processing temperature which can be determined by a preliminary test.

The nonsolvent used should only have such a limited swelling effect on the completed polyurethane that, on the introduction for example of a circular piece of film of the polyurethane for example 3 cm. in diameter and 0.2 to 0.5 mm. thick, less than 50 percent by weight (based on the sample film) have been absorbed after 34 hours. It is, of course, also possible to use mixtures of these non-swelling organic liquids. In addition, it is also possible for the mixture to contain organic liquids of the kind which swell the polyurethane to an extent in excess of 50 percent. However, organic liquids of this kind should have at most half the evaporation number of the other non-swelling components so that on drying they evaporate more quickly than the non-swelling organic liquids. The evaporation number can be determined in accordance with DIN 53 170.

The polar polyurethane solvents which can be added in accordance with the invention are preferably liquids which show a high swelling or dissolving power with respect to polyurethanes. Examples of solvents of this kind include N,N-dimethyl-, N,N-diethyl formamide, N,N-dimethyl-acetamide, N-methylmorpholine, formyl morpholine, N-acetyl morpholine, N-acetyl pyrrolidine, butyrolactone, N,N'-diacetyl piperazine diethyl sulphone, N,N'-diformyl piperazine, dimethylnitroamine (N,N) dimethyl sulphone, dipropyl sulphone, ethylene carbonate, methyl benzoate, propiolactone, N-methyl pyrrolidone, hexamethylphosphoramide, tetramethyl urea, dimethyl sulphoxide, dimethyl cyanamide, camphor and mixtures thereof.

Dimethyl formamide and dimethyl acetamide represent preferred additives because they are both easy to handle and readily available.

While the organic liquids used as "nonsolvent" have evaporation numbers of from 2 to 40 and preferably from 5 to 20 (for example, methyl-isobutylketone = 7.5, butylacetate = 12.1, ethylene chloride = 4.1, toluene = 6.1, xylene = 13.5, chlorobenzene = 12.5, perchlorethylene = 10.0, 2-butanone = 6.3, dioxane = 7.3 and acetic acid isoamyl ester = 18), the "polar solvents" which are additives in accordance with the invention have evaporation numbers of from 50 to 1,000, preferably from 50 to 150 (for example dimethyl formamide = 113, ethylglycol acetate = 60, hexalin acetate = 77, butylglycolacetate = 250 and o-dichlorobenzene = 57). Generally the evaporation number of the polar solvents according to the invention is at least 1½ times, preferably more than 2 times that of the nonsolvent present.

The maximum quantity of solvent which can be used in the preparation of the polyadducts is determined by the ability of the polyadducts to keep the solvents in the internal phase. The quantity of solvent actually used can amount from 30 to 100 percent and preferably from 50 to 98 percent of the maximum quantity, depending upon the lyophilicity of the starting materials, the reaction temperature and the composition. Films with a magnetic stirrer, the stirring is continued for 22 seconds and the resulting product is poured on to an approximately 600 cm² large glass plate. Polyadduct formation is then completed in a drying cabinet at 100°C., the solvent being evaporated off. A very smooth film was formed which withstood without damage more than 200,000 bends in a Bally Flexometer, had a tensile strength of 46kp/cm², a breaking elongation of 275 percent and a tear propagation resistance of 3 kp/cm for a permeability to water vapor of 1.1 mg/h cm².

TABLE 1

The tests were conducted in accordance with Example 1 with the components listed in Table 1

| Additive | (g) | chloro-benzene (ml) | xylene (ml) | Flexometer (bends) | Tensile strength (kp/cm²) | Breaking elongation (%) | Tear propagation resistance (kp/cm) | Permeability to water vapour (mg/h cm²) |
|---|---|---|---|---|---|---|---|---|
| Diethylmalonic acid diethyl ester | 12 | 20 | 90 | >200,000 | 30 | 255 | 2.5 | 8.5 |
| do. | 18 | 20 | 90 | >200,000 | 24 | 205 | — | 10.8 |
| Naphthalene | 6 | 20 | 90 | >200,000 | 32 | 325 | 2.3 | 4.3 |
| do. | 12 | 20 | 90 | >200,000 | 32 | 200 | 3 | 5.2 |
| do. | 3 | 20 | 90 | >200,000 | 37 | 260 | 3 | 4.5 |
| do. | 18 | 20 | 90 | >200,000 | 40 | 255 | 2.7 | 2.7 |
| 1-nitropyrene | 6 | 20 | 90 | >200,000 | 45 | 270 | 2.9 | 2.3 |
| do. | 3 | 20 | 90 | >200,000 | 41 | 275 | 2.6 | 2.3 |
| Camphor | 7 | 20 | 90 | >200,000 | 43 | 390 | 4.7 | 3.1 |
| do. | 3 | 20 | 90 | >200,000 | 37 | 385 | 4.6 | 4.0 |
| do. | 12 | 20 | 90 | >200,000 | 33 | 390 | 2.4 | 5.7 |
| do. | 18 | 20 | 90 | >200,000 | 30 | 400 | 2.5 | 6 |
| Pinene | 6 | 20 | 80 | >200,000 | 60 | 215 | 3 | 1 |
| ε-caprolactam | 3 | 20 | 90 | >200,000 | 35 | 350 | 3.3 | 2.3 |
| t-butanol | 36 | 40 | 110 | >200,000 | 34 | 170 | 2 | 4.3[1] |

1) 8 g of diol, 16.6 g of diisocyanate differing from one another in their porosity can be obtained by variation in this range.

Commercially, it is of little significance to start from less than 10 percent by volume solutions, especially as there is some danger of phase separation as polyaddition progresses, and the solvent often settles out in the form of a serum.

To insure that a film with adequate microporosity is obtained, the reaction mixture must gel soon after shaping (e.g., pouring out). Gelation means gel-like hardening of the reaction mixture without phase separation, i.e., without settling out of the solvents in the form of a serum. After gelation, the sheet structure can generally no longer reversibly be formed. After gelation, hardening progresses caused by the progress of the polyaddition reaction.

In this process other polymers, dyes, fillers, stabilizers and crosslinking agents, for example, in the form of solutions, organic dispersions or in the form of solids may be used. They are advantageously incorporated in the starting solutions.

One advantage of the process is its wide scope of application in regard to the starting components used and the solvents. The products obtained by the process can be used inter alia as filter materials and as porous coatings for textiles.

EXAMPLE 1

36.4 g. (30 mMols of OH) of a partly branched polyester of adipic acid and diethylene glycol, 6 g. (60 mMols of OH) of 1,4-di-β-hydroxyethoxybenzene are dissolved at 100° C. in 20 ml. of chlorobenzene and 70 ml. of xylene together with 6 g. of diethylmalonic acid diethylester (10 percent based on the polyurethane to be formed) and 0.2 g. of diazabicyclo-octane. 13.7 g. (110 mMols of NCO) of 4,4'-diisocyanatodiphenylmethane in 20 ml. of xylene are then added while stirring

EXAMPLE 2

30 g. (30 mMols of OH) of a partly branched butane diol polyadipate (OH number 56.5) and 4.5 g. (100 mMols of OH) of 1,4-butane diol were dissolved at 110°C. in 5 g. of dimethyl formamide, 30 ml. of chlorobenzene and 20 ml. of white spirit (an aliphatic hydrocarbon fraction boiling at 160°–196°C.), 13 g. (104 mMols of NCO) of 4,4'-diisocyanato-diphenylmethane and 0.1 g. of dibutyl tin dilaurate added, the mixture was stirred for 7 seconds and then poured on to a glass plate. On completion of polyaddition and after the solvent had been evaporated off, a film was formed which had a tensile strength of 25 kp/cm², a breaking elongation of 10 percent (by virtue of the NCO:OH ratio of 0.8), a tear propagation resistance of 1.3 kp/cm and a permeability to water vapour of 14 mg/h cm².

EXAMPLE 3

18 g. (20 mMols of OH) of a partly branched hexane diol polyadipate (OH number 62 ) and 3 g. (30 mMols of OH) of bis-(β-hydroxylethoxy)-1,4-benzene were similarly dissolved at 120° C. in 40 ml. of chlorobenzene, 8 g. of dimethyl acetamide and 25 ml. of white spirit, 18.8 g. (150 mMols of NCO) of 4,4'-diisocyanatodiphenylmethane and 0.4 g. of diazabicyclo-octane added, the mixture stirred for 20 seconds and then poured on to a polished VA-steel plate. Polyaddition was completed at 100° C. with the solvent being evaporated off. A porous film was formed which had a tensile strength of 54 kp/cm², a breaking elongation of 30 percent (on account of the NCO:OH-ratio of 3.0, very low), a tear propagation resistance of 3.5 kp/cm and a permeability to water vapour of 6 mg/h cm².

EXAMPLE 4

600 g. of a polyadipate with an OH-number of 117 (1,900 mMols of OH) were reacted after dehydration for 1 hour at 100°C. with 55 g. (65 percent) of 2,4- and (35 percent) of 2,6-tolylene diisocyanate (635 mMols of NCO) and 94.5 g. of a 75 percent solution in ethyl acetate of the addition product of tolylene diisocyanate with trimethylol propane (316 mMols of NCO). An extended polyester with an OH number of 68.3 was formed.

16.4 g. of this polyester (20 mMols of OH) were dissolved with 2 g. of di-(β-hydroxyethoxy)-1,4-benzene (20 mMols of OH) in 3 g. of dimethyl formamide and 90 ml. of chlorobenzene, 5.5 g. (44 mMols of NCO) of 4,4'-diisocyanato-diphenylmethane and 1 g. of triethylamine added, the resulting product was poured on to a Teflon plate after reaction for 60 seconds at 100° C. and then heated at 100° C. A film was formed which had a tensile strength of 38 kp/cm$^2$, a breaking elongation of 270 percent, a tear propagation resistance of 6 kp/cm and a permeability to water vapour of 17 mg/h cm$^2$.

EXAMPLE 5

34 mols of adipic acid were esterified with 18 mols of neopentyl glycol. After esterification was more or less over, recognisable from the amount of water distilled off, 2 mols of trimethylol propane and 18 mols of 1,6-hexane diol were added and esterification continued until a polyester with an OH-number of 64 and an acid number of 1.1 was formed.

17.4 g. (20 mMols of OH) of this polyester were dissolved with 3.5 g. (60 mMols of OH) of 1,6-hexane diol at 80°C. in 3 g. of camphor and 78 ml. of carbon tetrachloride. Following the addition of 10.9 g. of 4,4'-diisocyanatodiphenylmethane and 0.3 g. of diazabicyclo-octane, the mixture was stirred for 30 seconds, poured on to a glass plate and the reaction completed at 80°C. with the solvent being evaporated off. The microporous film formed had a permeability to water vapour of 5.1 mg/h cm$^2$, a tensile strength of 18 kp/cm$^2$, a breaking elongation of 100 percent and a tear propagation resistance of 3 kp/cm.

EXAMPLE 6

47.6 g. of a partly branched 1,12-dihydroxydodecane polyadipate (OH number 47) were dissolved with 4 g. (40 mMols of OH) of di-(β-hydroxyethoxy)-1,4-benzene at 100°C. in 6 g. of N-methyl pyrrolidone, 35 ml. of chlorobenzene and 125 ml. of white spirit, 11 g. of 4,4'-diisocyanatodiphenylmethane (88 mMols of NCO) and 0.3 g. of diazabicyclo-octane added, the resulting product was stirred for 15 seconds, poured on to a glass plate and then hardened at 100°C. A microporous film was formed which withstood without damage 200,000 bends in a Bally Flexometer at room temperature, and 20,000 bends (at −25°C.), had a tensile strength of 61 kp/cm$^2$, a breaking elongation of 235 percent, a tear propagation resistance of 4.1 kp/cm and a permeability to water vapour of 5.5 mg/h cm$^2$.

EXAMPLE 7

35.4 g. (40 mMols of OH) of a partly branched ethylene glycol polyadipate and 3.5 g. (30 mMols of NH) of 2,5-dichloro-1,4-diaminobenzene are dissolved at 100°C in 5 g. of dimethyl formamide and 105 ml. of xylene. 7.7 g. (88 mMols of NCO) of a mixture of 65 percent of 2,4- and 35 percent of 2,6-tolylene diisocyanate and 0.2 g. of diazabicyclooctane are then added, the mixture was stirred for 11 seconds and polyaddition completed at 100°C. with the solvent being evaporated off. The microporous film has a permeability to water vapour of 5.1 mg/h cm$^2$, a tensile strength of 42 kp/cm$^2$, a breaking elongation of 255 percent and a tear propagation resistance of 6.6 kp/cm.

Tests similarly carried out with 3,3'-dichloro-4,4'-diaminodiphenylmethane, 3,3'-dichloro-4,4'-diaminodiphenyl and 3,3'-dichloro-4,4'-diaminodiphenylether (in each instance 40 mMols of NH to 40 mMols of OF of the ester and 82 mMols of NCO of 4,4'-diisocyanatodiphenylmethane) produced microporous films with similar properties.

EXAMPLE 8

500 g. of a hexane diol polycarbonate (525 mMols of OH) are dehydrated for one hour at 13 Torr/110°C. This is followed by the addition of 131 g. (1,050 mMols of NCO) of 4,4'-diisocyanatodiphenylmethane with vigorous stirring, and then by heating for 30 minutes at 110°C. After cooling to room temperature, a prepolymer with an NCO-content of 3.38 percent (calc. 3.49 percent) is obtained.

25.6 g. (20 mMols of NCO) of the prepolymer are dissolved at 100°C. in 3 g. of dimethyl formamide and 85 ml. of perchlorethylene, followed by the addition with stirring of 2 g. of 4,4'-diaminodiphenylmethane (20 mMols of NH) in 3 g. of xylene. Stirring is then continued for 5 seconds and the mixture poured on to a hot glass plate. On completion of polyaddition and after the solvents have been evaporated off at 100°C., a microporous film is obtained which has a permeability to water vapour of 6 mg/h cm$^2$, a tensile strength of 96 kp/cm$^2$, a breaking elongation of 280 percent and a tear propagation resistance of 6 kp/cm. The film withstands without damage 200,000 bends in a Bally Flexometer.

EXAMPLE 9

1,000 g. (1,000 mMols of OH) of a polyethylene glycol polyadipate (OH number 56) were dehydrated for 1 hour at 13 Torr/110°C., followed by the addition of 250 g. (2,000 mMols of NCO) of 4,4'-diisocyanatodiphenylmethane and 417 g. of chlorobenzene. The mixture is then kept at 110°C. for 45 minutes. A prepolymer with an NCO-content of 2.34 percent (calc. 2.63 percent) was formed. 36 g. (20 mMols of NCO) of this prepolymer were dissolved at 100°C. in 40 ml. of chlorobenzene and 30 ml. of xylene. A solution of 3.5 g. (20 mMols of NH) of hexamethylene glycol-bis-(4-aminophenylcarbonate) in 6 g. of N-methyl pyrrolidone was then added with stirring and stirring was continued for 720 seconds. Thereafter the solution was poured on to a glass plate and heated at 100°C. A microporous film was formed which had a permeability to water vapour of 2.3 mg/h cm$^2$, a tensile strength of 70 kp/cm$^2$, a breaking elongation of 605 percent and a tear propagation resistance of 10 kp/cm.

EXAMPLE 10

1,500 g. (1,500 mMols of OH) of polyethylene glycol polyadipate (OH number 56) and 375 g. (1,200 mMols of OH of polyethylene glycol polyadipate (OH number 178) were dehydrated for 1 hour at 100°C./13 Torr. 486 g. (5,600 mMols of NCO) of a mixture of 65 percent of 2,4- and 35 percent of 2,6-tolylene diisocyanate were then added and the mixture stirred for 75 minutes at 110°C. A prepolymer with an NCO-content of 4.52% (calc. 4.95% NCO) was obtained.

a. 28 g. (30 mMols of NCO) of this prepolymer were dissolved at 100° C, in 5 ml. of chlorobenzene and 50 ml. of xylene and a solution of 0.69 g. (30 mMols of NH) of methylhydrazine and 0.1 g. of diazabicyclo-octane in 4 g. of DMF added. The mixture was then stirred for 80 seconds, poured on to a steel plate and heated at 100° C.

b. In a second test, 19 g. of the prepolymer were similarly dissolved in 90 ml. of toluene together with 19 g. of a 20 percent solution of a hydrolysed vinyl acetate/vinyl chloride copolymer in butyl acetate, followed by the addition at 100°C. of a mixture of 1.6 g. of 4,4'-diaminodiphenylmethane and 0.04 g. of methyl hydrazine in 4 g. of dimethyl sulphoxide. The solution was then stirred for 10 seconds, poured on to the glass and heated at 100°C.

The properties of the films thus obtained was as follows:

|  | a) | b) |
|---|---|---|
| Permeability to water vapour | 0.8 | 1.2 |
| Tensile strength (kp/cm$^2$) | 140 | 75 |
| Breaking elongation (%) | 590 | 280 |
| Tear propagation resistance (kp/cm) | 17 | 5.5 |

EXAMPLE 11

According to Example 1 of U.S. Pat. No. 3,100,721, an OH-prepolymer was prepared from polytetramethylene glycolether (molecular weight 1,000) and 2,4-tolylene diisocyanate with an NCO:OH-ratio of 1:2. By adding 4,4'-diisocyanatodiphenylmethane in an NCO-:OH-ratio of 2:1 an NCO-prepolymer was obtained 80 percent of which was taken up in benzene. It contained 2.51 percent of NCO.

62 g. of this prepolymer and 5 g. of 4,4'-diisocyanatodiphenylmethane were dissolved in 150 g. of a 10 percent tetrahydrofuran solution of polyvinyl chloride, 200 ml. of white spirit and 4 g. of dimethyl acetamide, the resulting solution heated to 60°C. and 3 ml. of a 1-molar aqueous hydrazine solution were introduced. The mixture was then stirred for 80 seconds, poured on to a glass plate and hardened at room temperature with the solvent being evaporated off.

A microporous film was formed which had a permeability to water vapour of 4.4 mg/h cm$^2$, a tensile strength of 27 kp/cm$^2$, a breaking elongation of 200 percent and a tear propagation resistance of 9.3 kp/cm.

EXAMPLE 12

Following dehydration 600 g. (583 mMols of OH) of a butylenepropylene glycol polyadipate (OH number 54.6) were reacted for 30 minutes at 110°C. with 146 g. (1,166 mMols of NCO) of 4,4'-diisocyanatodiphenylmethane to form a prepolymer with an NCO-content of 3.04 percent (calc. 3.28 percent).

83 g. of this prepolymer (60 mMols of NCO) and 0.6 g. of a carbon black rubbing in a polyether were dissolved at 100°C. in 9 g. of dimethyl formamide and 360 ml. of xylene, and the resulting solution was heated to 100°C. 0.3 g. of Solvent Black were then introduced into this solution. After uniform mixing, a solution of 6 g. of 4,4'-diaminodiphenylmethane in 9 g. of xylene was added, the mixture was stirred for 4 seconds, poured on to a glass plate and knife-coated. The glass-plate had previously been treated with an aqueous polyurethane dispersion pigmented with carbon black by spraying and dried at 100°C. before it was coated at an elevated temperature with the reactive solution. The microporous film obtained after drying which was already provided with a finish was bonded to skiver with a polyurethane solution of the kind described in DAS No. 1,225,380. The artificial leather thus obtained had the following properties.

| | |
|---|---|
| Permeability to water vapour: 3.5 mg/h cm$^2$ | |
| Resistance to hot rubbing (Satra, 300 revolutions): | no damage |
| Resistance to hot ironing (150°C.): | no damage |
| Flexometer (more than 200,000 bends): | no damage |
| Flexometer wet (more than 100,000 bends): | no damage |
| Fastness to wet rubbing: | no damage |
| Resistance to acetate: | no damage |

TABLE 2

38 g (40 mMols of OH) of the polyester of Example 7 with a slightly different OH-number were used in the same way as in Example 7. 6 g (60 mMols of OH) of di(β-hydroxyethoxy)-1,4-benzene and 13.7 g (110 mMols of NCO) of 4,4'-diisocyanatodiphenylmethane were used for crosslinking.

| Nonsolvent | (ml) | Additive according to the invention | Flexometer (g) | Tensile Strength (kp/cm$^2$) | Breaking Elongation (%) | Tear Prop. Resist. (kp/cm) | Permeability to water vapor (mg/h cm$^2$) |
|---|---|---|---|---|---|---|---|
| Xylene | 100 | N-methyl pyrrolidone | 11.6 > 200,000 | 90 | 455 | 9.9 | 2 |
| do. | 110 | do. | 11.6 > 200,000 | 93 | 380 | .11 | 1.2 |
| do. | 120 | do. | 11.6 > 200,000 | 67 | 345 | 8.5 | 2.5 |
| Perchloroethylene | 140 | camphor | 58 | 14 | 150 | 2 | 2.0 |
| do. | 170 | do. | 11.6 > 200,000 | 40 | 235 | 4.4 | 3.8 |

What is claimed is:

1. In a process for the production of microporous sheet structures by a process which comprises reacting an organic polyisocyanate with at least one organic compound containing at least two hydroxyl or amino hydrogen atoms reactive with NCO groups as starting materials to produce a polyaddition product which in the homogeneous state exhibits a shore A hardness greater than 40 and a softening range above about 100° C., said reaction being effected in an organic liquid which boils below 250° C., dissolves the starting materials but is a nonsolvent for the polyaddition product to be formed and has no significant swelling effect upon the polyaddition product, by applying the solution to a substrate and removing the organic liquid, the improvement which comprises, effecting said reaction in a mixture of said organic liquid and 1 to 300 percent by weight based on the weight of said polyaddition product to be formed of a solvent selected from the group consisting of N,N-dimethylformamide, N,N-diethyl formamide, N,N-dimethyl-acetamide, N-methylmorpholine, formyl morpholine, N-acetyl morpholine, N-acetyl pyrrolidine, butyrolactone, N,N'-diacetyl piperazine diethyl sulphone, N,N'-diformyl piperazine, dimethylnitroamine (N,N) dimethyl sulphone, dipropyl sulphone, ethylene carbonate, methyl benzoate, propiolactone, N-methyl pyrrolidone, hexamethylphosphoramide, tetramethyl urea, dimethyl sulphoxide, dimethyl cyanamide and camphor, said solvent having an evaporation number at least 1.5 times that of the aforesaid organic nonsolvent.

2. The process of claim 1 wherein the starting materials are a prepolymer prepared from a high molecular weight compound containing at least two terminal hydroxyl groups and an organic polyisocyanate at an NCO:OH ratio of from about 1.2 to about 7.0 and a chain extending agent.

* * * * *